(12) United States Patent
Krishnababu

(10) Patent No.: US 11,187,235 B2
(45) Date of Patent: Nov. 30, 2021

(54) METHOD FOR THE PREDICTION OF SURGE IN A GAS COMPRESSOR

(71) Applicant: Siemens Energy Global GmbH & Co. KG, Munich (DE)

(72) Inventor: Senthil Krishnababu, Lincoln (GB)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 645 days.

(21) Appl. No.: 15/747,498

(22) PCT Filed: Aug. 5, 2016

(86) PCT No.: PCT/EP2016/068760
§ 371 (c)(1),
(2) Date: Jan. 25, 2018

(87) PCT Pub. No.: WO2017/029131
PCT Pub. Date: Feb. 23, 2017

(65) Prior Publication Data
US 2018/0216623 A1    Aug. 2, 2018

(30) Foreign Application Priority Data

Aug. 14, 2015  (EP) ..................................... 15181154

(51) Int. Cl.
*F04D 27/00* (2006.01)
*G06F 30/23* (2020.01)
*G06F 111/10* (2020.01)

(52) U.S. Cl.
CPC ........... *F04D 27/001* (2013.01); *G06F 30/23* (2020.01); *F05D 2260/81* (2013.01);
(Continued)

(58) Field of Classification Search
CPC .... F04D 27/001; G06F 30/23; G06F 2111/10; F05D 2260/81; F05D 2260/821; F05D 2270/101
See application file for complete search history.

(56) References Cited

U.S. PATENT DOCUMENTS 5,217,348 A   6/1993  Rup et al.
7,003,426 B2  2/2006  Bonanni
(Continued)

FOREIGN PATENT DOCUMENTS

CN    101599104 A    12/2009
CN    101718269 A    6/2010
(Continued)

OTHER PUBLICATIONS

Leylek, Z., W. Anderson, G. Rowlinson and N. Smith. "An Investigation Into Performance Modeling of a Small Gas Turbine Engine." (2013).*

(Continued)

*Primary Examiner* — Kamini S Shah
*Assistant Examiner* — Peter Pham

(57) ABSTRACT

A computer implemented method for the prediction of the surge point of a compressor includes: generating a plurality of meshes: a compressor inlet mesh, at least a compressor rotor stage mesh, and a compressor outlet mesh, representing a plurality of exit guide vanes and an exit nozzle and extending up to a final nozzle exit area; assembling the plurality of meshes to obtain the CFD domain; specifying boundary conditions of the computational domain; specifying atmospheric pressure conditions at the final nozzle exit area; computing compressor inlet mass flow rate and compressor pressure ratio; checking if the numerical stability limit is not reached, as a result of the numerical stability limit not being reached: decreasing dimensions of the final nozzle exit area; generating again the compressor outlet
(Continued)

mesh; repeating the steps of specifying atmospheric pressure at the final nozzle exit area, the step of computing, and the step of checking.

14 Claims, 4 Drawing Sheets

(52) U.S. Cl.
CPC .. *F05D 2260/821* (2013.01); *F05D 2270/101* (2013.01); *G06F 2111/10* (2020.01)

(56) References Cited

U.S. PATENT DOCUMENTS

| | | | |
|---|---|---|---|
| 2004/0265124 A1* | 12/2004 | Liu | F01D 5/26 415/211.2 |
| 2006/0034689 A1 | 2/2006 | Taylor et al. | |
| 2010/0040453 A1* | 2/2010 | Vo | F04D 27/02 415/1 |
| 2015/0354464 A1* | 12/2015 | Hillel | F04D 27/0261 415/1 |
| 2015/0369073 A1* | 12/2015 | Japikse | F01D 9/06 415/115 |
| 2016/0123175 A1* | 5/2016 | Mazzaro | F04D 27/001 702/182 |
| 2016/0169241 A1* | 6/2016 | Walker | F02C 6/08 60/805 |
| 2016/0222973 A1* | 8/2016 | Reynolds | F04D 19/02 |

FOREIGN PATENT DOCUMENTS

| | | |
|---|---|---|
| EP | 1666733 A2 | 6/2006 |
| EP | 2570616 A2 | 3/2013 |
| JP | 2008045411 A | 2/2008 |
| RU | 2326271 C2 | 6/2008 |

OTHER PUBLICATIONS

International Search Report and Written Opinion dated Nov. 29, 2016, for PCT/EP2016/068760.
EP Search Report dated Feb. 26, 2016, for EP patent application No. 15181154.4.
Anonymous, Wikipedia, the free encyclopedia, Compressor characteristic, pp. 1-8, 2015, XP055249546; Retrieved from the Internet: URL:https://en.wikipedia.org/w/index.php?title=Compressor_characteristic&oldid=655969518.
Bergqvist S, Prediction of Turbo Compressor Maps using CFD, Master's thesis in Applied Mechanics, pp. 1-29, 2014, Chalmers University of Technology, Gothenburg SE, XP055250228; Retrieved from the Internet: URL:http://publications.lib.chalmers.se/records/fulltext/196400/196400.pdf.
Wang et al, Simulation and Performance Analysis on Centrifugal Compressors of Different Dimensions and Variable Operation Speed, Consumer Electronics, Communications and Networks (CECNET), 2011 International Conference on, IEEE; pp. 4400-4403, Sydney AU, XP031867825, DOI: 10.1109/CECNET.2011.5768944, ISBN: 978-1-61284-458-9; 2011.
Janke et al, Compressor map computation based on 3D CFD analysis, CEAS Aeronautical Journal, Springer, Vienna AU, vol. 6, No. 4, pp. 515-527, 2015, XP035576592; ISSN: 1869-5582, DOI: 10.1007/13272-015-0159-y.
Anonymous, Wikipedia, the free encyclopedia, Compressor map, pp. 1-6, 2014, XP055250252; Retrieved from the Internet: URL:https://en.wikipedia.org/w/index.php?title=Compressor_map&prin!able=yes.
Denton, John D., "Some Limitations of Turbomachinery CFD" Proceedings of ASME Turbo Expo 2010: Power for Land, Sea and Air GT2010 Jun. 14-18, 2010, Glasgow, UK; 2010.
John D Denton. Some Limitations of Turbomachinery CFD. Proceedings of ASME Turbo Expo 2010: Power for Land, Sea and Air GT2010 Jun. 14-18, 2010, Glasgow, UK; 2010.

* cited by examiner

METHOD FOR THE PREDICTION OF SURGE IN A GAS COMPRESSOR

CROSS REFERENCE TO RELATED APPLICATIONS

This application is the US National Stage of International Application No. PCT/EP2016/068760 filed Aug. 5, 2016, and claims the benefit thereof. The International Application claims the benefit of European Application No. EP15181154 filed Aug. 14, 2015. All of the applications are incorporated by reference herein in their entirety.

FIELD OF INVENTION

The present invention relates to a computer implemented method for the prediction of surge in a gas compressor performance through CFD ("Computational Fluid Dynamics") calculation.

ART BACKGROUND

In gas compressor design and development processes, ability to predict the surge margin through cost effective steady CFD calculation is of the most importance. However, in the present state of the art, to predict the surge margin with confidence may be significantly difficult. This is in particular due to the drawbacks of the current CFD models, i.e. domains that are meshed and solved for in CFD calculation. Typically, it is known to apply CFD calculation methodologies to models comprising: —inlet geometry, including inlet guide vanes; —rotor stages geometry, —stator stages geometry; —outlet geometry, including exit guide vanes.

Average static pressure boundary conditions applied immediately at the outlet of the exit guide vanes is varied to simulate various pressure ratios. When numerical instability is reached it is assumed that an estimation of the surge point is reached. However, estimation of the real compressor through numerical instability may be not accurate, for the sheer restrictive nature of the boundary condition applied so close to the exit guide vanes outlet, thus leading to artificial flow separation near the exit causing numerical instability. In fact, the real compressor is usually followed by either the combustion system or an exit plenum which usually are not taken into account in the known CFD models, above describe.

The purpose of the present invention is to overcome these inconveniences, in order to reach a better estimation of the real surge point of the compressor through CFD calculation.

SUMMARY OF THE INVENTION

In order to achieve the main purpose defined above, a computer implemented method according to the independent claim is provided. The dependent claims describe advantageous developments and modifications of the invention.

According to the present invention, it is provided computer implemented method for the prediction of the surge point of a compressor comprising the following sequence of steps: —generating a plurality of meshes suitable for "Computer Fluid Dynamics" calculation of the compressor, the meshes including: —a compressor inlet mesh, —at least a compressor rotor stage mesh, —a compressor outlet mesh, representing a plurality of exit guide vanes and an exit nozzle and extending up to a final nozzle exit area, —assembling the plurality of meshes to obtain the "Computer Fluid Dynamics" computational domain, —specifying boundary conditions of the computational domain, —specifying atmospheric pressure conditions at the final nozzle exit area, —computing through "Computer Fluid Dynamics" calculation the flow along the compressor for calculating compressor inlet mass flow rate and compressor pressure ratio, —checking if a predefined numerical stability limit is reached and, if the numerical stability limit is not reached then: —decreasing dimensions of the final nozzle exit area, —generating again the compressor outlet mesh, —repeating said steps of specifying atmospheric pressure at the final nozzle exit area, said step of computing and said step of checking.

Advantageously, a nozzle is provided in the computational domain at the downstream of the exit guide vanes to gradually ease the pressure off to atmospheric levels. Atmospheric pressure boundary conditions are applied at the outlet of the nozzle irrespective of the pressure ratio being modelled. Various pressure ratios and mass flow rates are then achieved by varying the exit area of the nozzle through to when numerical instability is reached.

The pressure ratio and the inlet mass flow rate, which are calculated when numerical instability point is achieved, are assumed to correspond to the compressor real surge point. Experimental tests have confirmed that the surge point calculated through the present invention is actually close to the real surge of the compressor, within an acceptable error margin.

According to a possible embodiment of the present invention, the length of compressor outlet mesh is n times the length of the exit guide vanes of the compressor. More particularly n may be comprised between 10 and 15. The length of the compressor outlet mesh is chosen, in order to conveniently and gradually ease the pressure at the downstream of the exit guide vanes off to atmospheric levels.

According to another possible embodiment of the present invention, the length of compressor outlet mesh is kept constant throughout the steps of the method, in particular during the step of decreasing dimensions of the final nozzle exit area, when the numerical stability limit is not yet reached. Advantageously, this allows operating only on one boundary geometrical parameter when modifying the compressor outlet mesh between two successive executions of the computing step.

According to another possible embodiment of the present invention, the compressor outlet mesh comprises a section where a compressor exit pressure is determined for pressure ratio calculation.

The exit pressure is then used to calculate the compressor pressure ratio to be used in populating the compressor maps with the points determined through the present method.

Using on the compressor map the points calculated through the method of the present invention, the compressor surge margin, when operating the compressor, can be predicted more accurately.

According to another possible embodiment of the present invention, the step specifying boundary conditions of the computational domain comprises the sub steps of: —specifying atmospheric boundary conditions at inlet, —specifying speed of rotating surfaces, —specifying mixing plane at row interfaces.

Advantageously, this provides a realistic CFD model of the compressor.

BRIEF DESCRIPTION OF THE DRAWINGS

The aspects defined above and further aspects of the present invention are apparent from the examples of embodiment to be described hereinafter and are explained with reference to the examples of the embodiment. The invention will be described in more detail hereinafter with reference to examples of embodiment but to which the invention is not limited.

DETAILED DESCRIPTION

Figure 1:
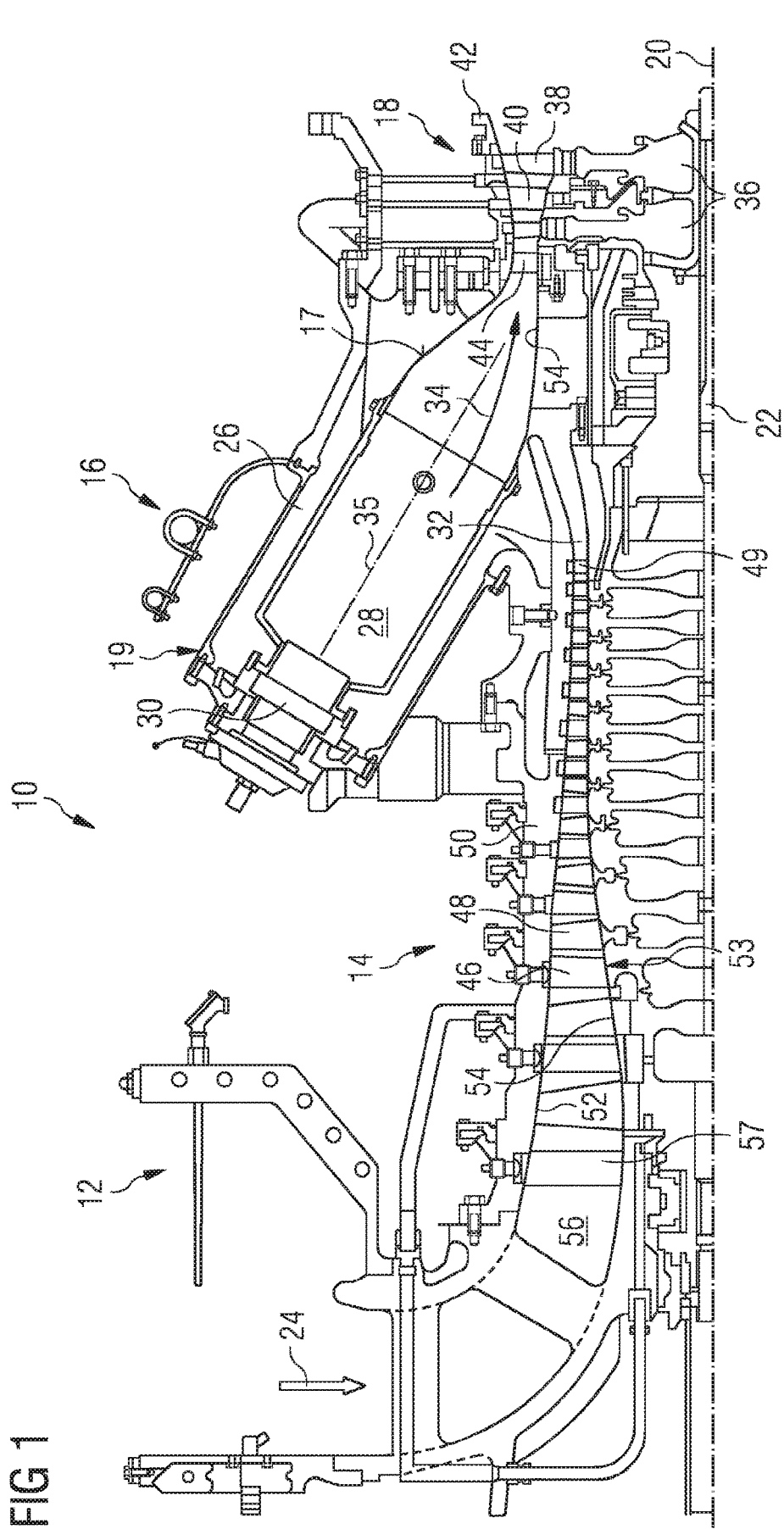
FIG. 1 is a longitudinal sectional view of a gas turbine engine including a compressor, whose performance may be predicted with the method of the present invention.

FIG. 1 shows an example of a gas turbine engine 10 in a sectional view. The gas turbine engine 10 comprises, in flow series, an air inlet 12, a compressor section 14, a combustor section 16 and a turbine section 18 which are generally arranged in flow series and generally about and in the direction of a longitudinal or rotational axis 20. The gas turbine engine 10 further comprises a shaft 22 which is rotatable about the rotational axis 20 and which extends longitudinally through the gas turbine engine 10. The shaft 22 drivingly connects the turbine section 18 to the compressor section 14.

In operation of the gas turbine engine 10, air 24, which is taken in through the air inlet 12 is compressed by the compressor section 14 and delivered to the combustion section burner section 16. The burner section 16 comprises a burner plenum 26, one or more combustion chambers 28 and at least one burner 30 fixed to each combustion chamber 28. The combustion chambers 28 and the burners 30 are located inside the burner plenum 26. The compressed air passing through the compressor 14 enters a diffuser 32 and is discharged from the diffuser 32 into the burner plenum 26 from where a portion of the air enters the burner 30 and is mixed with a gaseous or liquid fuel. The air/fuel mixture is then burned and the combustion gas 34 or working gas from the combustion is channelled through the combustion chamber 28 to the turbine section 18 via a transition duct 17.

The turbine section 18 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine engine 10, are disposed between the stages of annular arrays of turbine blades 38. Between the exit of the combustion chamber 28 and the leading turbine blades 38 inlet guiding vanes 44 are provided and turn the flow of working gas onto the turbine blades 38.

The combustion gas from the combustion chamber 28 enters the turbine section 18 and drives the turbine blades 38 which in turn rotate the shaft 22. The guiding vanes 40, 44 serve to optimise the angle of the combustion or working gas on the turbine blades 38.

The turbine section 18 drives the compressor section 14. The compressor section 14 comprises an axial series of stator vane stages 46 and rotor blade stages 48. The rotor blade stages 48 comprise a rotor disc supporting an annular array of blades. The compressor section 14 also comprises a casing 50 that surrounds the rotor stages and supports the vane stages 48. The guide vane stages include an annular array of radially extending vanes that are mounted to the casing 50. The vanes are provided to present gas flow at an optimal angle for the blades at a given engine operational point. Some of the guide vane stages have variable vanes, where the angle of the vanes, about their own longitudinal axis, can be adjusted for angle according to air flow characteristics that can occur at different engine operations conditions.

A first stage of guide vanes, immediately upstream the first upstream rotor blade stage, are identified as inlet guide vanes ("IGV") 57. A last stage of guide vanes, immediately downstream the last downstream stator blade stage and upstream the diffuser 32, are identified as exit guide vanes ("EGV") 49.

The casing 50 defines a radially outer surface 52 of the inlet passage 56 of the compressor 14. A radially inner surface 54 of the inlet passage 56 is at least partly defined by a rotor drum 53 of the rotor which is partly defined by the annular array of blades 48.

The terms upstream and downstream refer to the flow direction of the airflow and/or working gas flow through the engine unless otherwise stated. The terms upstream and downstream refer to the general flow of gas through the engine. The terms axial, radial and circumferential are made with reference to the rotational axis 20 of the engine.

Figure 2:
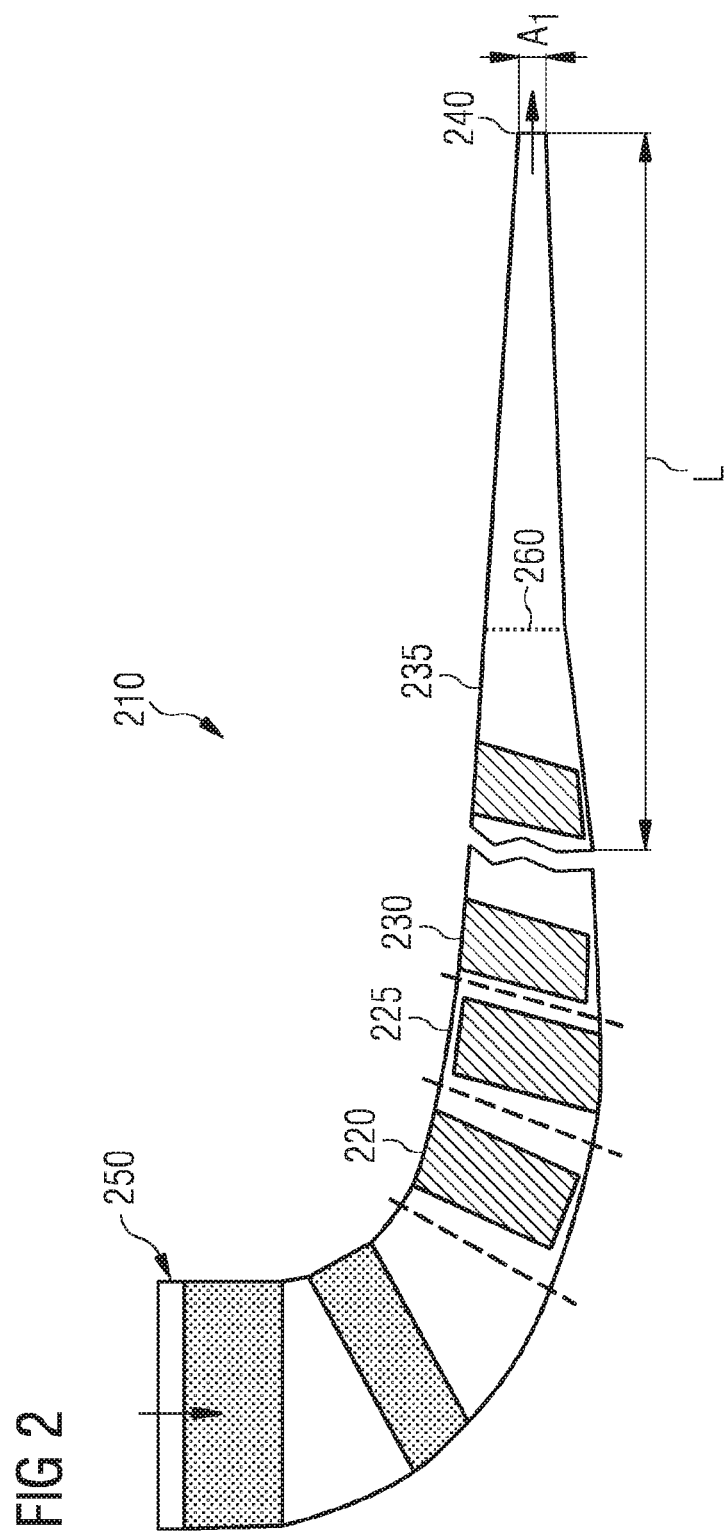
FIG. 2 shows a model of the compressor in FIG. 1.

FIG. 2 shows an example of a model 210 of the compressor section 14 according to the method 100 of the present invention.

In general, according to the present invention any compressor may be modelled, for example irrespective of the fact that the compressor may or not be coupled with a turbine. The burner section 16 and the turbine section 18 are in fact not modelled according to the method of the present invention, which is performed in order to simulate the performance of the compressor alone and calculate the compressor working points which typically defines a compressor maps.

One-stage compressors may also be modelled.

Models of compressor according to the present invention take into account only a circumferential portion of the compressor around its axis of rotation. The circumferential extent of the model is considered rotational periodic.

Figure 3:
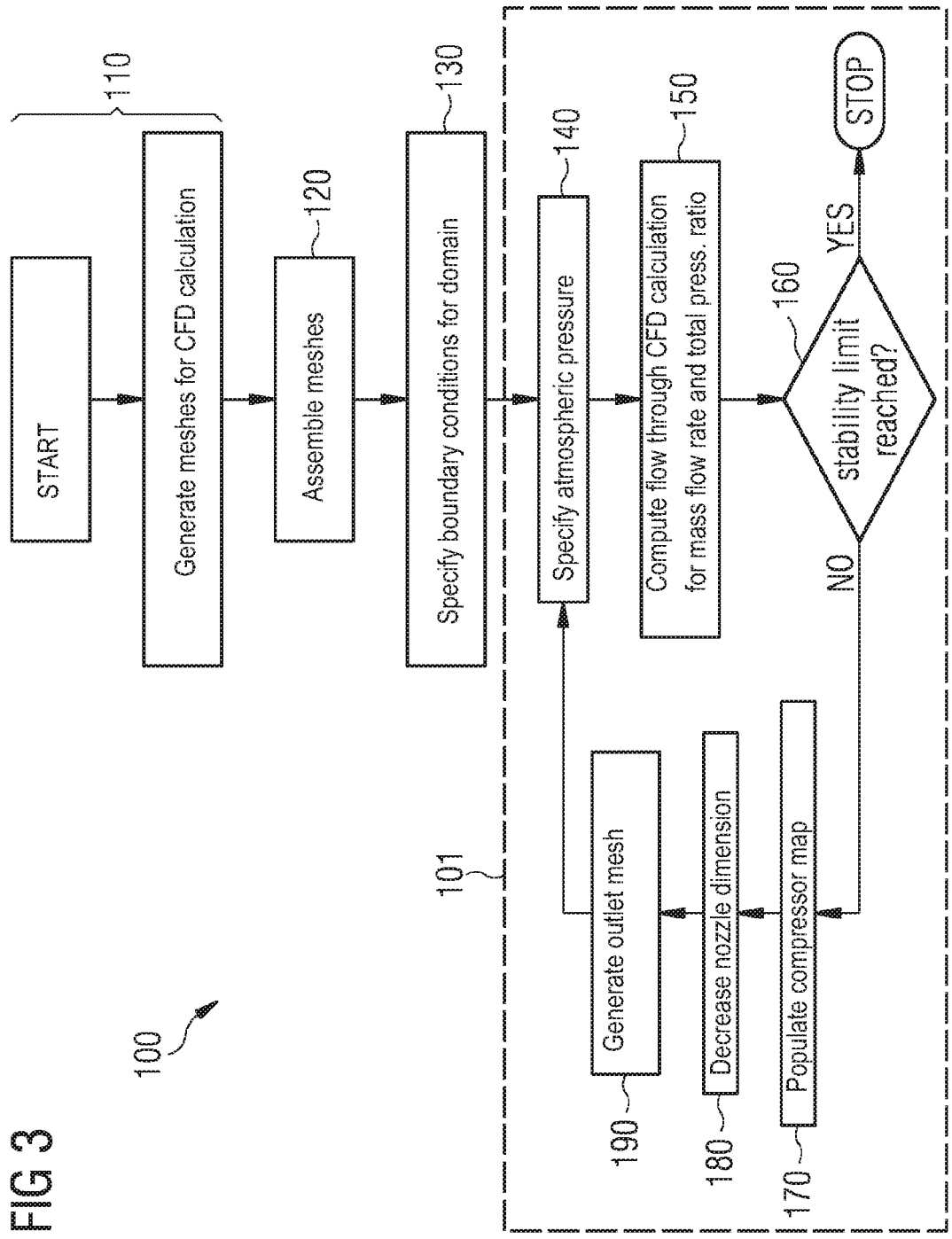
FIG. 3 shows a schematic flow diagram of the method of the present invention.

The multistage model 210 is created, according to the method of the present invention, through the sequence of steps schematically represented in the block diagram of FIG. 3.

In a first step 110 of the method 100 a plurality of meshes suitable for "Computer Fluid Dynamics" (CFD) calculation of the compressor 14 are generated. The plurality of meshes includes: —a compressor inlet mesh 220 representing the stage of inlet guide vanes 57; —a plurality of compressor rotor stage meshes 225 representing, respectively, the plurality of rotor blade stages 48; —a plurality of compressor stator stage meshes 230 representing, respectively, the plurality of stator blade stages 46; —a compressor outlet mesh 235, representing the plurality of exit guide vanes 49 and, downstream to them, an exit nozzle extending up to a final nozzle exit area 240.

The compressor outlet mesh 235 is to be treated as a single mesh representing both the exit guide vanes 49 and the nozzle and not as a plurality of meshes separated by artificial interfaces.

The compressor outlet mesh 235 has a length L which is chosen to be n times the length of the exit guide vanes 49 of the compressor 14, with n typically being an integer comprised between 10 and 15. A first area value A1 of the final nozzle exit area 240 is chosen.

The nozzle downstream the exit guide vanes provides a gradual connection between the outlet pressure downstream the exit guide vanes 49 and atmospheric pressure conditions.

In a second step 120 of the method 100 the plurality of meshes 220, 225, 230, 235 are assembled together to obtain the "Computer Fluid Dynamics" computational domain 250.

In a third step 130 of the method 100 boundary conditions of the computational domain 250 are specified. The third step 130 of the method 100 comprises the sub steps of: —specifying atmospheric boundary conditions at the inlet of the computational domain 250; —specifying the speed of rotating surfaces, i.e. the surfaces representing the rotor blade stages 48; —specifying mixing planes representing artificial interfaces between the meshes 220, 225, 230, 235 of the computational domain 250, for taking into account the flow transitions between compressor stationary and rotating portions; —define which of the surfaces of the rotational periodic model 210 have to be considered rotational periodic.

After the third step 130, the method 100 comprises a loop 101 of steps which includes: —a fourth step 140 of specifying atmospheric pressure conditions at the final nozzle exit area 240, —a fifth step 150 of computing through CFD calculation the flow along the compressor 14, in order to calculate in particular the corrected compressor inlet mass flow rate and the compressor total pressure ratio between pressure values at a predefined section 260 of the compressor outlet mesh 235 and at the inlet of the computational domain 250. The predefined section 260 represents in the compressor outlet mesh 235 the section immediately downstream the exit guide vanes 49 in the compressor 14.

After the fifth step 150, the loop 101 further includes a sixth step 160 of checking if a predefined numerical stability limit is reached and, if the numerical stability limit is not reached then the loop 101 continues with the following steps: —a seventh step 170 of populating a compressor map M with a point representing the corrected compressor inlet mass flow rate and the compressor total pressure ratio calculated in the previous fifth step 150; —an eight step 180 of decreasing the dimensions A1 of the final nozzle exit area 240, while length L is kept constant. In particular, according to an embodiment of the present invention, A1 may be decreased in steps of 5%, i.e., for example, if the initial A1 value is 20 mm the second one is 19 mm, the third 18 mm and so on; —a ninth step 190 of generating again the compressor outlet mesh 235.

After the ninth step 190, the forth step 140, the fifth step 150 and the sixth step 160 are repeated.

At each execution of the computing fifth step 150 the compressor outlet mesh 235 is slightly different from the previous execution of the computing fifth step 150. This leads to different values the corrected compressor inlet mass flow rate and the compressor total pressure ratio and, consequently, to respective different points on the compressor map M.

The loop 101 is ended when at the sixth step 160 the numerical stability is reached. The point on the map calculated during the last execution of the computing fifth step 150 is assumed to be representative of a respective compressor surge point.

Figure 4:
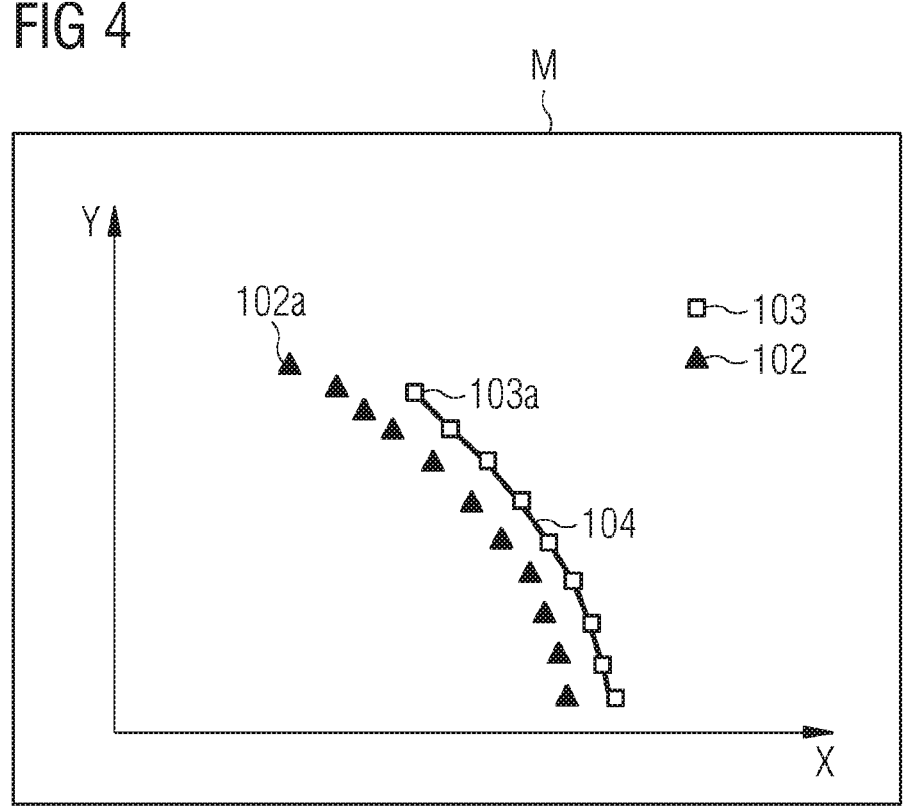
FIG. 4 shows, on a compressor map, a comparison between experimental points and points calculated through the method of the present invention.

Results which can be achieved with the present invention are shown in FIG. 4 where a compressor map M is shown including a horizontal axis X for corrected compressor inlet mass flow rate and a vertical axis Y for the compressor total pressure ratio. For a compressor rotating at a given speed, triangular marks 102 represents experimental test data. Among the plurality of marks 102, the mark 102a, characterized by the higher total pressure ratio and the lower corrected compressor inlet mass flow rate, represents the compressor experimental surge point at the given rotating speed.

For the same compressor, a plurality of points calculated through the method 100 is represented in the map M by the rectangular marks 103. The curve 104, connecting the rectangular marks 103, represents, in the compressor map M, the speed curve at the given rotating speed. Other similar curve may be calculated by considering a different value of rotating speed during the execution of the method 100, in particular of the third step 130. Among the plurality of marks 103, the mark 103a, characterized by the higher total pressure ratio and the lower corrected compressor inlet mass flow rate, represents the compressor calculated surge point at the given rotating speed.

The distance between the experimental and calculated surge points 102a, 103a, both in terms of compressor ratio and inlet mass flow rate, provides a satisfactory validation of the present method, being significantly lower than analogous distances which may be obtained with other existing CFD methods.

The invention claimed is:

1. A computer implemented method for the prediction of the surge point of a compressor comprising the following sequence of steps:
    generating a model of the compressor including a plurality of meshes suitable for "Computer Fluid Dynamics" calculation of the compressor, the meshes including:
    a compressor inlet mesh representing a stage of inlet guide vanes of the compressor,
    a plurality of compressor rotor stage meshes representing a respective plurality of rotor blade stages of the compressor,
    a compressor outlet mesh, representing a plurality of exit guide vanes and an exit nozzle extending up to a final nozzle exit area of the outlet mesh,
    assembling the plurality of meshes to obtain the "Computer Fluid Dynamics" computational domain,
    specifying boundary conditions of the computational domain including specifying at least a speed of surfaces of the computational domain representing the rotor blade stages of the compressor,
    specifying atmospheric pressure conditions at the final nozzle exit area,
    computing through "Computer Fluid Dynamics" calculation of the flow along the compressor and calculating a value of a compressor inlet mass flow rate and a value of a compressor pressure ratio,
    checking if a predefined numerical stability limit is reached,
    wherein in response to the numerical stability limit not being reached in the checking step, the method further comprises:
    adjusting the compressor outlet mesh by decreasing in the computational domain a dimension of the final nozzle exit area,
    generating again the compressor outlet mesh based on the decreased dimension of the final nozzle exit area,
    repeating said steps of specifying atmospheric pressure at the final nozzle exit area, said step of computing and said step of checking,
    wherein upon the numerical stability limit being reached in the checking step, then the method is stopped and a surge point of the compressor is predicted based on the generated compressor outlet mesh with the decreased dimension in the computational domain of the final nozzle exit area, wherein a length of compressor outlet mesh is n times a length of the exit guide vanes of the compressor.

2. The computer implemented method according to claim 1, wherein n is an integer comprised between 10 and 15.

3. The computer implemented method according to claim 1, wherein the length of compressor outlet mesh is kept constant in said step of decreasing the dimension of the final nozzle exit area.

4. The computer implemented method according to claim 1, wherein the compressor outlet mesh comprises a section where a compressor exit pressure is determined in order to calculate the compressor pressure ratio.

5. The computer implemented method according to claim 1, wherein the step of specifying boundary conditions of the computational domain comprises the sub steps of:
specifying atmospheric boundary conditions at an inlet of the computational domain,
specifying interfaces between the meshes of the computational domain for taking into account flow transitions between the meshes.

6. The computer implemented method according to claim 1, wherein the method further includes:
a step of populating a compressor map with a point representing the compressor inlet mass flow rate and the compressor total pressure ratio calculated in said computing calculation of the flow along the compressor.

7. The computer implemented method according to claim 6, wherein upon the numerical stability limit not being reached from the checking step, then the point on the map calculated during the last execution of the step of computing the flow along the compressor is assumed to be representative of a respective compressor surge point.

8. The computer implemented method according to claim 1, wherein the surge point of the compressor is predicted as a point corresponding on a map of the compressor to the specified speed and to the last calculated value of the inlet mass flow rate and the last calculated value of the compressor pressure ratio, wherein the map of the compressor comprises a first axis for values of the inlet mass flow rate and a second axis for values of the compressor pressure ratio.

9. The computer implemented method according to claim 8, wherein the point on the map to predict the surge point of the compressor is based on a first value along the first axis and a second value along the second axis.

10. The computer implemented method according to claim 1, wherein the value of the compressor pressure ratio is calculated between a pressure value at a predefined section of the compressor outlet mesh and a pressure value at an inlet of the computation domain.

11. The computer implemented method according to claim 1, wherein the method is for predicting the surge point of the compressor of a gas turbine engine comprising a burner section and a turbine section and wherein the burner section and the turbine section are not modelled in the method.

12. The computer implemented method according to claim 11, wherein the generated model is to simulate the performance of the compressor alone.

13. The computer implemented method according to claim 1, wherein the generating the model further comprises generating a plurality of stator stage meshes representing a respective plurality of stator blade stages.

14. A computer implemented method for the prediction of the surge point of a compressor comprising the following sequence of steps:
generating a model of the compressor including a plurality of meshes, the meshes including:
a compressor inlet mesh representing a stage of inlet guide vanes of the compressor,
a plurality of compressor rotor stage meshes representing a respective plurality of rotor blade stages of the compressor,
a compressor outlet mesh, representing a plurality of exit guide vanes and an exit nozzle extending up to a final nozzle exit area of the outlet mesh,
assembling the plurality of meshes to obtain a computational domain,
specifying boundary conditions of the computational domain including specifying at least a speed of surfaces of the computational domain representing the rotor blade stages of the compressor,
specifying atmospheric pressure conditions at the final nozzle exit area, computing the flow along the compressor and calculating a value of a compressor inlet mass flow rate and a value of a compressor pressure ratio,
checking if a predefined numerical stability limit is reached,
wherein in response to the numerical stability limit not being reached in the checking step, the method further comprises:
adjusting the compressor outlet mesh by decreasing in the computational domain a dimension of the final nozzle exit area,
generating again the compressor outlet mesh based on the decreased dimension of the final nozzle exit area,
repeating said steps of specifying atmospheric pressure at the final nozzle exit area, said step of computing and said step of checking,
wherein upon the numerical stability limit being reached in the checking step, then the method is stopped and a surge point of the compressor is predicted based on the generated compressor outlet mesh with the decreased dimension in the computational domain of the final nozzle exit area,
wherein a length of compressor outlet mesh is n times a length of the exit guide vanes of the compressor.

* * * * *